Dec. 20, 1966 MASAO ANDO 3,293,407
APPARATUS FOR MAINTAINING LIQUID BEING TRANSPORTED
IN A PIPE LINE AT AN ELEVATED TEMPERATURE
Filed Nov. 7, 1963
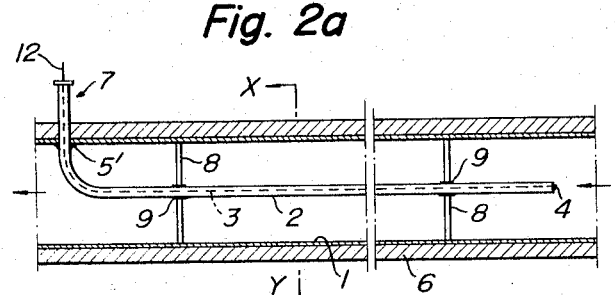
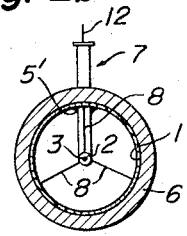
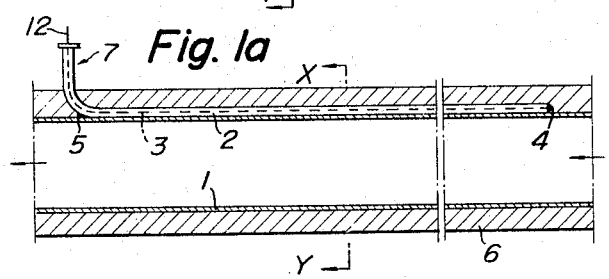
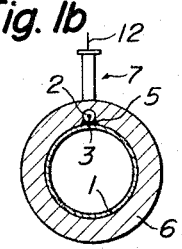
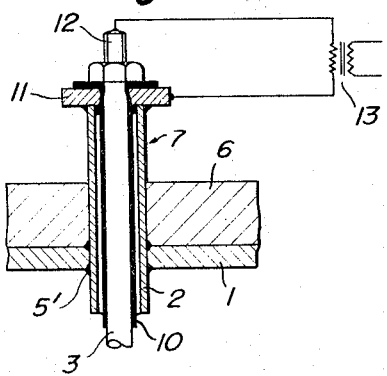
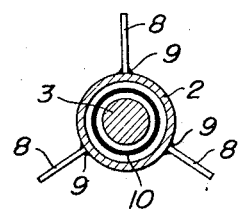
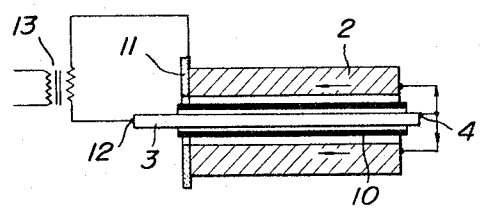
INVENTOR
MASAO ANDO
BY Paul M. Craig, Jr.
ATTORNEY

United States Patent Office 3,293,407
Patented Dec. 20, 1966

3,293,407
APPARATUS FOR MAINTAINING LIQUID BEING TRANSPORTED IN A PIPE LINE AT AN ELEVATED TEMPERATURE
Masao Ando, Tokyo, Japan, assignor to Chisso Corporation, a corporation of Japan
Filed Nov. 7, 1963, Ser. No. 322,168
Claims priority, application Japan, Nov. 17, 1962, 37/51,557
14 Claims. (Cl. 219—301)

This invention relates to methods of and apparatus for transporting liquid in a pipe line at an elevated temperature. More particularly it relates to a method of and apparatus for maintaining liquid being transported in a pipe line at an elevated temperature by utilizing skin effect of alternating current (A.C.).

It has been a difficult problem to transport a liquid which is highly viscous or which needs temperature maintenance to a distant place through a pipe line. For example, such highly viscous liquid as heavy fuel oil need be transported through pipe line using pumps of large capacity, and the selection of suitable pumps is a difficult problem due to the viscosity to overcome. In such cases, a usual measure is to reduce viscosity of oil by keeping it at an elevated temperature during its transportation. For this purpose the tracing of the pipe line with a steam pipe is a common practice when the transportation distance is not very long, for example, in case of pipe lines within a plant. However this method is not suitable when pipe lines are extending over a long distance and must cross hills and fields.

In "Neue Pipeline Konstruktion für schweres Heizöl," Fachzeitschrift für angewandte Energie und allgemeine Technik; December 1962, S433–438, there is described a method which employs heated lubricant oil instead of steam flowing in tracing pipes. Considering the smaller specific heat of the lubricant oil, it is apparent that this method requires a large amount of lubricant oil as well as large sized tracing pipes. Accordingly, it can by no means be called an economical method.

There are known other methods in which heat generated by Ohm's law is utilized such as to let electric current flow directly in transportation pipes or to wind heat-generating elements outside of the transportation pipes. However all these methods involve difficult problems in electrical insulation and are not satisfactory for long distance pipe lines. Especially when the liquid is of a combustible kind, it is difficult to utilize these methods.

An object of the present invention is to provide an economical and safe method and apparatus for transporting liquids having high viscosity at the room temperature or liquids which need temperature maintenance to a distant place utilizing the principle that A.C. does not flow uniformly across the section of ferro-magnetic pipe even when it is of commercial lower frequency, but exhibits strong skin effect, thereby generating heat in the ferromagnets pipe.

Further objects and advantages of the present invention will be understood by the following description when considered in connection with the accompanying drawings, in which drawings (b) of FIG. 1 and FIG. 2 are cross-sectional views of transportation pipes using single phase A.C. taken at respectively X–Y and X–Y of drawings 1a and 2a, respectively, 1a and 2a being longitudinal sectional views. FIG. 3 is an enlarged longitudinal sectional view at a terminal of a conductor, FIG. 4 is an enlarged cross-sectional view of the heat-generating pipe as shown in FIG. 2(b) and FIG. 5 is a schematic diagram for explaining the principle of operation of the present invention.

In FIG. 5, a heat-generating pipe 2 and a conductor 3 are insulated from each other by an electrical insulator 10. A.C. from a source transformer 13 passes a terminal 12, the conductor 3 and another terminal 4 to one end of the heat-generating pipe 2. The current passed by the heat-generating pipe 2 is returned to the source transformer 13 by way of a terminal 11 as shown by arrows. When steel pipes are used as the heat-generating pipes, the current density is not uniformly distributed across the pipe cross-section due to the skin effect of A.C. in ferromagnetic substance, but it is rather concentrated within the inner portion of the pipe wall and is practically zero at the outer portion of the pipe wall. Thus the pipe is heated by joules heat due to the concentrated current at the skin part of the inner wall of the pipe. The region through which the current flows is called a penetration depth. Let it be S (cm.), inner diameter of the pipe be d (cm.) and if $d \gg S$, S can be expressed approximately by a formula of $$S = 5030 \sqrt{\frac{\rho}{\mu f}}$$

in which $\rho$ is the characteristic resistance of the pipe material used ($\Omega$ cm.), $\mu$ is the magnetic permeability and $f$ is frequency (cycles/sec.). In this formula, the value $\mu$ is dependent on the current passing the pipe and the temperature of the pipe, but when current and heat produced thereby are sufficient only to heat pipe lines for temperature maintenance the value of S is about 1 mm. If the thickness of the pipe is assumed to be 2–3 mm. for safety, there is no current flowing in the outer surface zone of the heat-generating pipe in the circuit such as shown in FIG. 5 while the pipe is being heated. Accordingly, in the case of commonly used pipes having thickness more than 2–3 mm., impedance in relation with the source 13 has nothing to do with the pipe thickness, but it is only dependant on inner diameter and length of the pipe. Thus it is possible to heat the pipe line and liquid therein.

In FIG. 1, a heat generating pipe 2 of ferromagnetic material is welded onto the outer surface of the liquid transportation pipe 1 in longitudinal direction, continuously or discontinuously. The conductor 3 enters the heat-generating pipe 2 at one end 7 of the pipe and runs through the pipe 2 and is electrically connected with the heat-generating pipe 2 at the other end of the pipe 2 with a connecting line welded to the other end of the conductor terminal 4. A.C. from the source transformer (not shown) enters the conductor 3 at a terminal 12, leaves it from the terminal 4, enters the heat-generating pipe wall and returns to the source transformer as shown in FIG. 3. When the current flows, the heat-generating pipe generates heat by the skin effect and as a result the liquid transport pipe and liquid therein are heated. The outer surface of the liquid transporting pipe is insulated by the insulating layer 6. When the liquid transporting pipes have a relatively large inner diameter, it is possible to install several sets of the heat-generating pipe circumferentially according to the abovementioned arrangement. It is also possible to fix up three phase balanced arrangement by the proper combination of the phase in each section. In the construction of the pipe lines which use the present invention it is convenient to fabricate by welding the heat generating pipe simultaneously with the welding of the liquid transporting pipe, inserting the conductor and connecting the latter with the heat generating pipe each in every unit length, and to repeat the same procedure over the whole length of one section and ultimately to the total sections. Thus the pipe line is installed completely but neither insulation between the pipe line and heat-generating pipe nor ground connection is necessary due to the above-mentioned construction.

FIG. 2 shows of a case in which the heat generating pipe 2 is installed coaxially in the interior of the liquid transporting pipe. The heat generating pipe extends through the liquid transporting pipe at 7 and is welded thereto at 5' in airtight relation. Supports 8 which support the heat generating pipe in the interior of the liquid transportation pipe are provided at suitable intervals. They may be welded on the outer surface of the heat generating pipe as shown by 9, or may be arranged to support firmly by other suitable means.

In the arrangement in FIG. 2, as the temperature difference between the heat generating pipe and the liquid transporting pipe is larger than in the case of FIG. 1, it would be safer to give them flexibility so as to slide against the liquid transporting pipe when the heat generating pipe expands or contracts. This type of arrangement gives better thermal efficiency because the heat generating pipe is installed in the interior of the liquid transporting pipe but it will not be suitable when the liquid to be transported is liable to form scale. FIG. 3 shows the construction of the terminal portion of the pipe 2 shown in FIG. 2. The part where the heat generating pipe 2 penetrates the wall of the liquid transporting pipe 1 does not need insulation. Firm and direct welding is necessary at the part 5'. Between the conductor 3 and the heat generating pipe 2, a suitable insulating material 10 such as heat-resistant synthetic resin pipe, porcelain vessel or porcelain insulating tube is inserted. Alternatively, an asbestos insulated conductor can be used. The conductor end 12 penetrates the terminal plate 11 which is welded to the end of the heat generating pipe 2 and the both are fixed and insulated from each other. Electric voltage from the source transformer 13 is supplied between this terminal plate and the end of the conductor. The electric circuit formed in this manner is shown in FIG. 5.

If desired it is possible to provide an anti-explosion construction or the like, but as they do not differ from the anti-explosion construction of the terminal portion of common electric apparatus such as circuit breakers or transformers, the detailed explanation thereof will be omitted here. FIG. 4 shows an enlarged cross-sectional view of the heat generating pipe of FIG. 2.

It goes without saying that filling of an inert gas such as nitrogen or the like in the interior of the heat generating pipe shown from FIG. 1 to FIG. 5 is favorable for electrical insulation but if the pressure of the gas is positive versus atmospheric pressure, such accidents as formation of cleavage and holes in the heat generating pipe due to corrosion, for instance, can be readily detected with a gas pressure checking apparatus. Gas filling can be achieved by providing a small branch pipe (not shown), for example at the terminal part 7 and filling the gas therefrom.

By use of the liquid transporting method of the present invention, it is possible to obtain various advantages over conventional methods. First of all the present method is the most economical and reliable method. Reliability against accident and low cost for maintenance is the important factor for pipe lines especially when they are very long e.g. when they are extending over hundreds of miles. The present method is quite satisfactory in this regard. The present method can be applied to pipe lines constructed even in the water or under the ground. Although heating is performed by electric current there is no need for paying special attention to insulation and combustible property of the liquid to be transported.

As the present method makes oil transportation cheaper, it eases the requirements for the selection of plant sites where a large amount of heavy oil is consumed, such as heavy oil burning steam power plant.

In order to show specific embodiments of the present invention, following examples are cited.

*Example 1*

According to the method shown in FIG. 1 heavy fuel oil was transported by use of a steel pipe line having an outer diameter of 400 mm. over a distance of 7 km. As the heat generating pipe lines steel pipes having outer diameter of 27.2 mm. and thickness of 2.8 mm. were used; one line was on the top and the other on the bottom of the outer surface of liquid transporting pipe.

As insulated conductor in the heat generating pipe, asbestos insulated copper strand wire of 22 mm.$^2$ was used. As lagging material 100 mm. mineral wool pad was used.

Heavy oil was heated up to 50°–70° C. by steam at oil-sending station and introduced into the above-mentioned pipe line. Transformers were placed at intervals of 600 m., but at a central part, with an interval of 1,200 m. When the secondary voltage of the transformers was at the highest value of 200 v., the frequency was 50 cycles/sec. and the temperature range of the heavy oil being transported was from 50° to 70° C., it was possible by the pipe line of the present invention to transport up to 13,000 kl. of heavy fuel oil per day with a power requirement of 60 kw./km. As the temperature difference between the heat-generating pipe and the liquid transporting pipe was lower than 2° C., there was no need of paying attention to heat stress and the like. The heavy oil to be sent was heated up to the appointed temperature at the oil sending station and introduced into the transporting pipe line. With normal operation, there was no need of the electric heating, but it was necessary to lower the viscosity of the heavy oil by the heating method of the present invention so as to be able to make the starting operation for the next time easier when the transportation is stopped or the transportation is carried out with a relatively lower load. In the case of a relatively short transportation distance with relatively large diameter transporting pipe, it is important that the expenses relating to the construction cost, i.e., depreciation, interest, for the construction cost, etc., is cheaper than the power rate.

The construction cost of heating apparatus according to the present invention is about 5–7 percent of that of the liquid transporting pipe and accordingly, the above mentioned expenses such as depreciation, interest etc. are only a very slight amount.

*Example 2*

According to the method shown in FIG. 2, heavy fuel oil was transported by use of steel pipe having an outer diameter of 165.2 mm. over a distance of 500 m. As the heat generating pipe, one line of the steel pipe as in FIG. 2 was inserted in the center of the oil transporting pipe. As an insulated conductor in the heat generating pipe, asbestos-insulated copper strand wire of 22 mm.$^2$ was used. As a lagging material, 52 mm. thick mineral wool pad is used. The heavy oil was heated up to a temperature of 50°–70° C. by steam at the oil sending station and pumped into the pipe line.

When the secondary voltage of the transformer was 200 v., frequency was 50 cycles/sec. and the temperature range of heavy oil to be sent was 50°–70° C., it was possible to send 2,200 kl. of heavy fuel oil per day by use of 45 watts/m.

Having described several embodiments of an apparatus for transporting liquid while maintaining it at an elevated temperature constructed in accordance with the invention, it is believed obvious that many modifications and variations of the invention are possible in the light of the above teachings. It is therefore to be understood that changes may be made in the particular embodiments of the invention described which are within the full intended scope of the invention as defined by the appended claims.

What I claim is:

1. An apparatus for transporting liquid while maintaining it at an elevated temperature comprising an arrangement including a liquid transporting pipe, at least one heat-generating pipe of ferro-magnetic material supported in substantially axially parallel relation with said transporting pipe so as to conduct heat generated in said heat-generating pipe to the liquid in said transporting pipe, and said heat-generating pipe having an inner wall portion and an outer surface portion a wall thickness greater than the penetration depth of alternating current flow through the inner wall portion of said heat-generating pipe to thereby obviate any provision of electrical insulating means on the outer side of said heat-generating pipe, and an inner electric conductor line connected to a source of A.C. supply and supported within said heat-generating pipe in its longitudinal direction in electrically insulated relation from the inner wall portion of said heat-generating pipe, and said electric conductor line being electrically connected at the end thereof remote from the A.C. supply source in such a way that alternating current from the supply source flows through said electric conductor line, reaches said remote end of said heat-generating pipe and returns to the source through the inner wall portion of said heat-generating pipe, whereby said heat-generating pipe is heated by the skin effect of the alternating current flow through the inner wall portion thereof and the outer surface portion of said heat-generating pipe receives solely the heat so generated without any electric current flow therethrough.

2. An apparatus according to claim 1, wherein the outer surface portion of the heat-generating pipe is laid in contact with the outer surface of the liquid transporting pipe in its longitudinal direction.

3. An apparatus according to claim 1, wherein the heat-generating pipe is welded onto the outer surface of the liquid transporting pipe in its longitudinal direction.

4. An apparatus according to claim 1, wherein the heat-generating pipe is disposed in the interior of the liquid transporting pipe and has one end thereof extending outwardly through the wall of the liquid transporting pipe.

5. An apparatus according to claim 1, wherein the heat-generating pipe is filled with an inert gas preferably at a pressure higher than the atmospheric pressure.

6. An apparatus according to claim 2, wherein the heat-generating pipe is filled with an inert gas preferably at a pressure higher than the atmospheric pressure.

7. An apparatus according to claim 4, wherein the heat-generating pipe is filled with an inert gas preferably at a pressure higher than the atmospheric pressure.

8. An apparatus for transporting liquid while maintaining it at an elevated temperature comprising an arrangement including a liquid transporting pipe, at least one heat-generating pipe of ferro-magnetic material supported in substantially axially parallel relation with said transporting pipe so as to conduct heat generated in said heat-generating pipe to the liquid in said transporting pipe, and said heat-generating pipe having an inner wall portion and an outer surface portion a wall thickness greater than the penetration depth of alternating current flow through the inner wall portion of said heat-generating pipe to thereby obviate any provision of electrical insulating means on the outer side of said heat-generating pipe, and a source of A.C. supply electrically connected to the inner wall portion of remote ends of said heat-generating pipe, in such a way that alternating current from the supply source flows through the inner wall portion of said heat-generating pipe, whereby said heat-generating pipe is heated by the skin effect of the alternating current flow through the inner wall portion thereof and the outer surface portion of said heat-generating pipe receives solely the heat so generated without any electric current flow therethrough.

9. An apparatus according to claim 8, wherein the outer surface portion of the heat-generating pipe is laid in contact with the outer surface of the liquid transporting pipe in its longitudinal direction.

10. An apparatus according to claim 8, wherein the heat-generating pipe is welded onto the outer surface of the liquid transporting pipe in its longitudinal direction.

11. An apparatus according to claim 8, wherein the heat-generating pipe is disposed in the interior of the liquid transporting pipe and has one end thereof extending outwardly through the wall of the liquid transporting pipe.

12. An apparatus according to claim 8, wherein the heat-generating pipe is filled with an inert gas preferably at a pressure higher than the atmospheric pressure.

13. An apparatus according to claim 9, wherein the heat-generating pipe is filled with an inert gas preferably at a pressure higher than the atmospheric pressure.

14. An apparatus according to claim 11, wherein the heat-generating pipe is filled with an inert gas preferably at a pressure higher than the atmosphere pressure.

References Cited by the Examiner

UNITED STATES PATENTS

| | | | |
|---|---|---|---|
| 1,265,554 | 5/1918 | Valdes | 219—292 |
| 1,437,384 | 11/1922 | Crane | 219—292 X |
| 1,525,508 | 2/1925 | McCormick | 219—292 |
| 1,727,585 | 9/1929 | Carleton | 219—300 |
| 2,224,403 | 12/1940 | Lines | 158—360 X |
| 2,306,831 | 12/1942 | Proctor | 219—300 |
| 2,802,520 | 7/1957 | Trabilcy | 219—306 X |

RICHARD M. WOOD, *Primary Examiner.*

C. L. ALBRITTON, *Assistant Examiner.*